United States Patent [19]

Lance et al.

[11] Patent Number: 4,548,875

[45] Date of Patent: Oct. 22, 1985

[54] HEATED TRANSPORTABLE FUEL CELL CARTRIDGES

[75] Inventors: Joseph R. Lance, N. Huntingdon; Francis R. Spurrier, Whitehall, both of Pa.

[73] Assignee: Westinghouse Electric Corp., Pittsburgh, Pa.

[21] Appl. No.: 593,220

[22] Filed: Mar. 27, 1984

[51] Int. Cl.[4] .......................................... H01M 8/02
[52] U.S. Cl. ..................................... 429/26; 429/34; 429/46
[58] Field of Search ................. 429/26, 120, 24, 34, 429/46

[56] References Cited

U.S. PATENT DOCUMENTS

| 3,269,866 | 8/1966 | Dixon et al. | 429/26 |
| 3,839,091 | 10/1974 | Bloomfield | 429/46 X |
| 3,865,630 | 2/1975 | Reimers | 420/26 |
| 3,964,930 | 6/1976 | Reiser | 429/26 |
| 3,969,145 | 7/1976 | Greustad | 429/26 |
| 4,189,527 | 2/1980 | Stadnick et al. | 429/26 |
| 4,233,369 | 11/1980 | Breault | 429/26 |
| 4,310,604 | 1/1982 | Marchetti | 429/26 X |
| 4,310,605 | 1/1982 | Early et al. | 429/26 X |
| 4,342,816 | 8/1982 | Kothmann et al. | 429/120 X |

FOREIGN PATENT DOCUMENTS 55070 4/1982 Japan ..................................... 429/26

Primary Examiner—Anthony Skapars
Attorney, Agent, or Firm—D. P. Cillo

[57] ABSTRACT

A fuel cell stack protective system is made where a plurality of fuel cells, each containing liquid electrolyte subject to crystallization, is enclosed by a containing vessel, and where at least one electric heater is placed in the containing vessel and is capable of preventing electrolyte crystallization.

9 Claims, 6 Drawing Figures

HEATED TRANSPORTABLE FUEL CELL CARTRIDGES

GOVERNMENT CONTRACT

This invention was made or conceived in the course of or under Contract No. DEN-3-290 with the U.S. Government, as represented by the National Aeronautics And Space Administration.

BACKGROUND OF THE INVENTION

Fuel cell modules, comprising a fuel cell cartridge containing four or more fuel cell stacks, with associated fuel, oxidant and coolant entry and exit manifolds, support plates, electrical connections and the like, disposed around a central cooling duct, a removable enclosure or pressure dome, are taught by Kothmann et al., in U.S. Pat. No. 4,342,816, and by Westinghouse Electric Corporation brochure: "Gas-Cooled Fuel Cell Power Plants For The 80s", October 1980, Frontiers Of Power Conference, Oklahoma State University, both herein incorporated by reference. These fuel cell stacks must be remanufactured periodically, due to, for example, catalyst degradation within the anodes and cathodes of the plurality of individual fuel cells making up the stacks.

The fuel cell modules are located at the power plant site. A 7.5 MW power plant would contain about 20 fuel cell modules, each module containing four, 2.4 meter (8 foot) high fuel cell stacks, containing about 420 fuel cells per stack, enclosed by a 3.6 meter (12 foot) high, 1.5 meter (5 foot) in diameter, removable dome. The dome would weigh about 1091 kg (2,400 pounds) and the four fuel cell stacks used per module would have a total weight of about 2,727 Kg (6,000 pounds). The fuel cell stacks must be removed from the plant, transported, perhaps a thousand miles or more, remanufactured at a factory location, transported back, and then reinstalled at the plant site.

Transporting an entire fuel cell module, including all bottom attachments to gas inlet and exit conduits, having a total weight of about 5,454 kg (12,000 pounds) is needlessly expensive in terms of shipping cost, and such a module presents major problems of detachment from and reattachment to gas inlet and exit conduits, which in the case of cooling air, are of large diameter. Additionally, when the fuel cells are of the highly concentrated phosphoric acid type, i.e., above about 70% concentration, temperatures of about 38° C. (100° F.) must be maintained to prevent phosphoric acid crystallization, and a resulting loss of performance when the fuel cells are operated in the power plant.

The fuel cell modules would be out of doors and exposed to the elements. In the northwest, northeast, and central plains of the United States, the modules would be subject to freezing temperatures and snow in the winter time, making the required 38° C. temperature difficult to maintain during at least one third of the year.

What is needed is a means to transport fuel cell stacks or modules that would: minimize transportation costs, provide features for ease of lifting, handling and tie down during transportation, simplify the disconnection and reconnection of the module to the gas connections at the site, and most importantly, provide thermal protection during shipping so that the electrolyte does not crystallize.

SUMMARY OF THE INVENTION

The above needs have been met, and the above problems solved, generally, by enclosing a plurality of the fuel cells, containing liquid electrolyte which may crystallize upon cooling, to essentially seal the fuel cells from the surrounding air, where at least one heater is disposed inside the containing enclosure vessel.

More specifically, the above problems have been solved by disposing at least one, long, heating means in the central cooling duct of an arrangement of fuel cell stacks disposed around said duct, each stack containing a plurality of fuel cells, each fuel cell containing liquid electrolyte, where the fuel cell stacks are attached to and enclosed by a protective containing vessel. The vessel will have lifting means thereon so that it and the attached, enclosed fuel cell stacks can be moved. The heating means will be attached to a power source, and be capable of generating an amount of heat effective to provide an electrolyte temperature over the electrolyte crystallization temperature.

Preferably, the central cooling duct will be surrounded by four fuel cell stacks, with oxidant and coolant, usually air, entering the enclosed module at the bottom of the dome. All of the air passes through coolant plate channels in the stacks, to exit into the central cooling duct. Part of the air then passes through oxidant channels in fuel cell bipolar plates. Hydrogen or other fuel gas is passed through fuel channels in the fuel cell bipolar plates, to exit at the opposite side of the fuel cell. The fuel cell contains, in addition to the bipolar plates, which act as an oxidant and fuel passage means, an anode and a cathode, both containing platinum or other suitable catalyst, and a central electrolyte matrix or other containing means containing electrolyte, such as concentrated phosphoric acid. The fuel cell and the module operate at about 150° C. to about 205° C. (about 300° F. to about 400° F.), and at about 4.8 atmospheres pressure.

The heating means used to prevent electrolyte crystallization during transport of the module, or at any other time the module is not in operation and its temperature is below 38° C., will usually consist of from 1 to 8 spaced, insulated, tubular electrical resistance heaters. Such heating means are preferably an integral part of the module. The protective containing vessel can be either the removable module dome, or a separate, thin, steel or high strength plastic container, each with attached lifting eyes. Use of this arrangement, allows ease of lifting, provides thermal protection during disassembly and shipping, and prevents electrolyte crystallization.

BRIEF DESCRIPTION OF THE DRAWINGS

For a better understanding of the invention, reference may be made to the preferred embodiments exemplary of the invention, shown in the accompanying drawings, in which.

DESCRIPTION OF THE PREFERRED EMBODIMENTS

Figure 1:
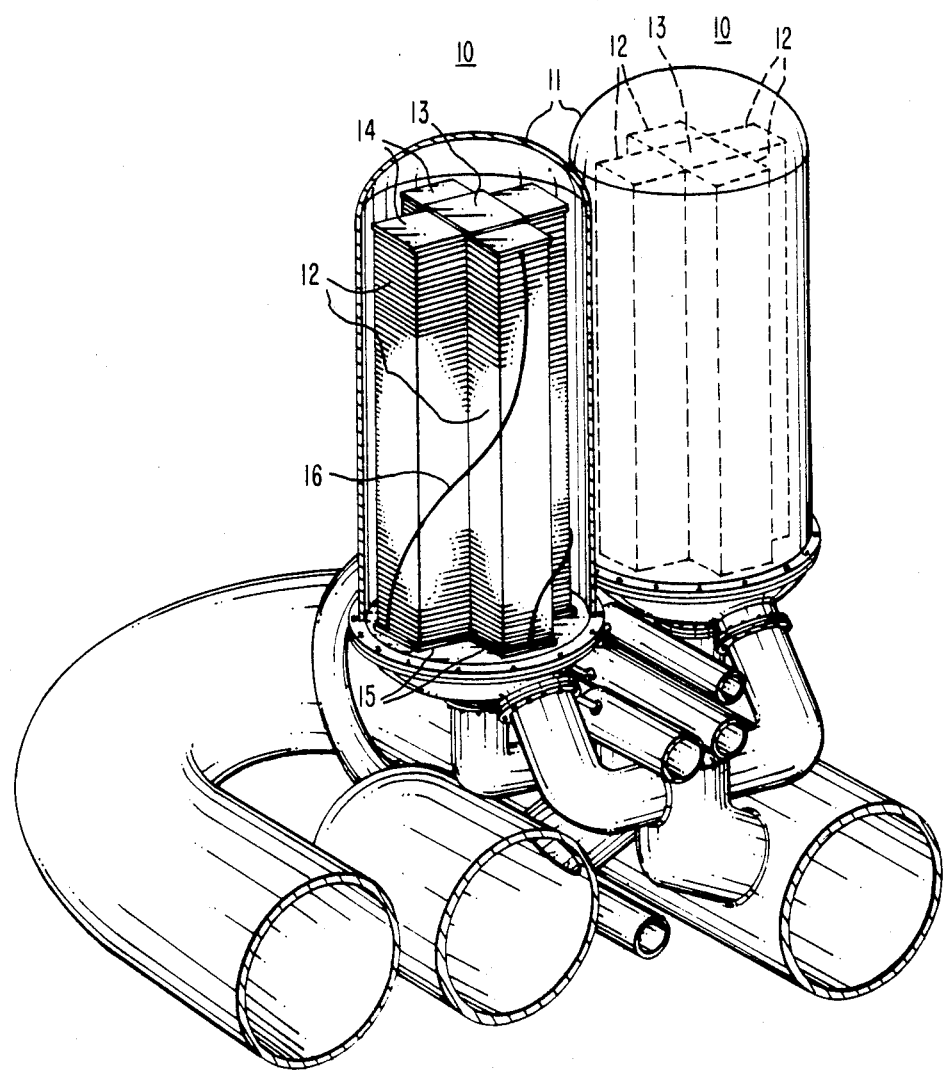
FIG. 1 is a pictorial view of assembled, connected fuel cell modules, showing four fuel cell stacks disposed within a heavy, pressure dome.

Referring now to FIG. 1 of the Drawings, two adjacent fuel cell modules 10 are shown, with removable, protective, pressure domes 11 in place. The modules are shown attached at their bottom to various sized fuel and air feed, and return conduits. The fuel will preferably be a $H_2$-rich gas. This gas can be obtained from steam reforming of light hydrocarbons (methane, propane, butane, etc.). Inside the domes, four fuel cell stacks 12 are shown, comprising a fuel cell cartridge, disposed around and completely enclosing a central cooling duct 13. Top plates 14, support plate 15 and cell stack electrical interconnections 16 are also shown.

Each fuel cell stack 12 is between about 1.8 meters to about 3.6 meters (about 6 feet to about 12 feet) high, and, for a preferred 2.4 meter (8 foot) high stack, will contain from about 400 to about 450 individual fuel cells. Cooling plates will be disposed between each set of about five adjacent fuel cells. The individual fuel cells will usually contain a carbon bipolar plate having, on one surface, oxidant channels therethrough, and, on the other surface, fuel channels therethrough. Each fuel cell contains, in addition to the bipolar plates, an anode and cathode, both containing platinum or other suitable catalyst, and a central electrolyte matrix, containing liquid electrolyte, such as, from about 95% to about 98% concentrated phosphoric acid.

Oxidant and cooling gas, usually air, enters the enclosed module, usually at the bottom and outside of the stacks, between the stacks and the dome wall. This air passes through coolant plate channels in the stacks, to exit into the central cooling duct. Some of the air then passes through oxidant channels in the fuel cell bipolar plates, and exits into collection piping means, not shown, which exits through the bottom of the module. The fuel enters, generally through piping, not shown, into fuel channels in the bipolar plates, generally in a counter flow direction to the oxidant, and is removed, generally through piping, not shown.

The fuel cells and module operate at about 150° C. to about 205° C. (about 300° F. to about 400° F.), and at about 4.8 atmospheres pressure. Air is used to cool the system by passage through channels in cooling plates, disposed throughout the fuel cell stack height, and into the central cooling duct. Both the depleted oxidant, and the cooling air, can exit through the bottom of the module. Such fuel cell stack arrangements are taught by Kothmann, in U.S. Pat. No. 4,342,816, and exhaustive details on the various arrangements can be found therein.

Figure 2:
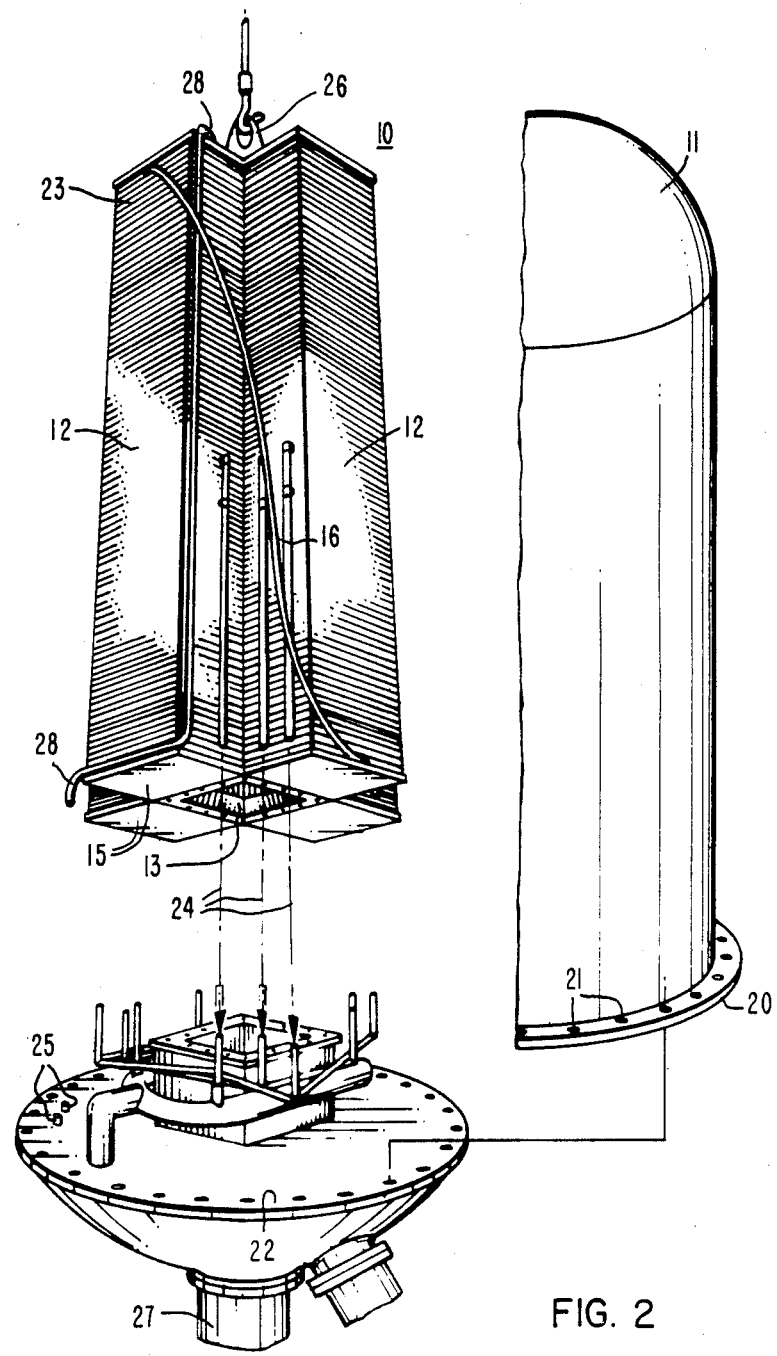
FIG. 2 is an exploded pictorial view of a fuel cell module, with the fuel cell stack cartridge, in process of disassembly from process gas connections on its support structure, showing exposure to the elements upon removal of the pressure dome.

FIG. 2 is an exploded view of fuel cell module 10 of FIG. 1. Pressure dome 11 is shown in a fragmented, detached view with flange 20 having connection holes 21 therethrough, matched to those through lower pressure vessel bracing plate 22. The fuel cell cartridge 23, comprising the four assembled, bolted together fuel cell stacks 12 with all their associated tubing, connections and the like, on their support plate 15, is shown being lifted along the disconnected process gas connection axis 24 and from electrical terminals 25, by means of a lifting eye or fixture 26, attached to the top of the fuel cell cartridge. Central cooling duct 13 is shown disconnected from the air return conduit 27. Cell stack electrical interconnections 16 are shown as well as the heating wire 28 from the heater used in accordance with this invention, which may be disposed in the middle of the cartridge. As can be seen, if the dome 11 is removed and the fuel cell cartridge 23 is disconnected from the gas connections and bottom plate, it will be exposed to dirt and dust, and perhaps rain or snow, and in cold weather, any attempt to keep it above the phosphoric acid electrolyte crystallization temperature of about 38° C. (100° F.) could require a very large amount of internal heating energy.

Figure 3:
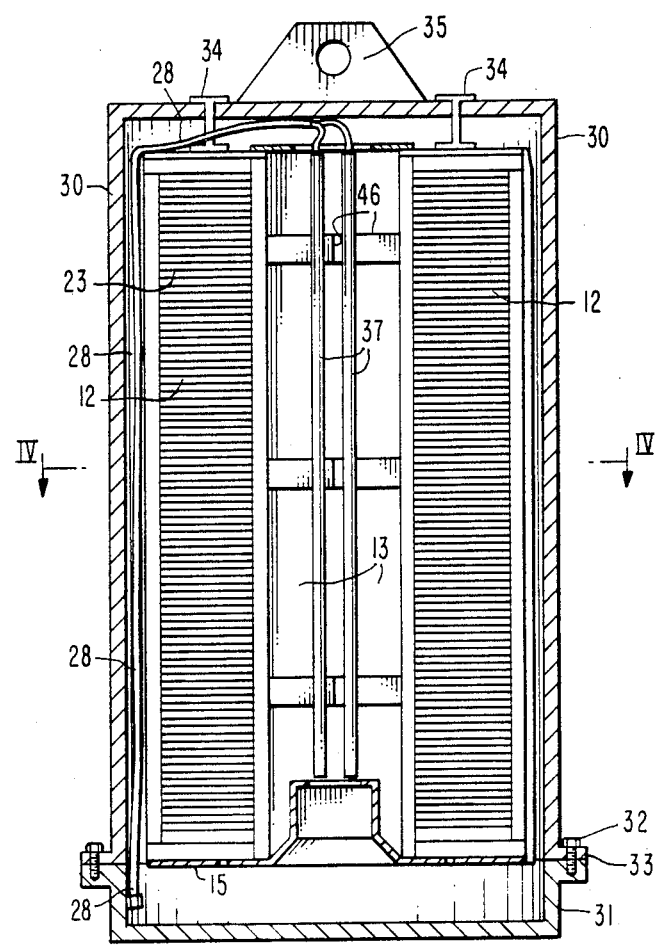
FIG. 3 is a sectional view of a fuel cell stack cartridge as it would be shipped in one embodiment of a protective containing vessel, showing the handling and heating features.

FIG. 3 shows one embodiment of an arrangement of fuel cell stacks 12 disposed about a central cooling duct 13, forming the fuel cell cartridge 23, all enclosed by protective containing transport vessel 30, ready for shipment to a plant for fuel cell remanufacture, or back to the power plant site for reinstallment. The protective vessel can be made of steel or high strength plastic about 0.097 cm. (¼ inch) thick, and can have a bottom portion 31 attached by means of bolts 32 through flange 33.

The fuel cell cartridge can be connected to the containing vessel 30 by means of, for example, bolts or other suitable connections 34. Lifting eye 35 is shown attached to the top of protective vessel 30. Several other lifting eyes could be attached to the protective vessel along its top circumference. Most usually the protective vessel will have a circular cross-section, and be effective to essentially seal the fuel cells from the surrounding air.

The central cooling duct 13 connects to the air return conduit, not shown, upon reassembly. Long, spaced heating means 37 are shown disposed in the central cooling duct. While the heating means are preferably placed in the center of the cartridge, they could also be disposed on the outside of the cartridge near the vessel walls or any combination of the two locations.

One or as many as 8 spaced heaters, preferably two to four insulated, tubular, electrical resistance heaters, such as, for example, resistance wires insulated by magnesia refractory and clad by stainless steel, well known in the art, can be used. Preferably, each heater will generate from about 7,000 BTU to about 9,000 BTU of heat per hour. Such heating means are preferably an integral part of the module and can be switched off when the module is in operation producing power. The heating means 37 must be capable of generating an amount of heat effective to provide an electrolyte temperature throughout the fuel cell cartridge over the crystallization temperature of the electrolyte used, i.e., in the case of concentrated phosphoric acid electrolyte, over about 38° C. (about 100° F.).

Heating wire 28, from the central heating means is also shown, extending from the top of the cartridge to the bottom of the cartridge next to the inside wall of the protective containing vessel 30, as well as support plate 15. This arrangement comprises a completely enclosed fuel cell cartridge, providing thermal protection and ease of lifting. It can be utilized when the protective dome is to be left at the power plant site, and so, is not to be utilized in any fashion during fuel cell cartridge transport.

Figure 4:
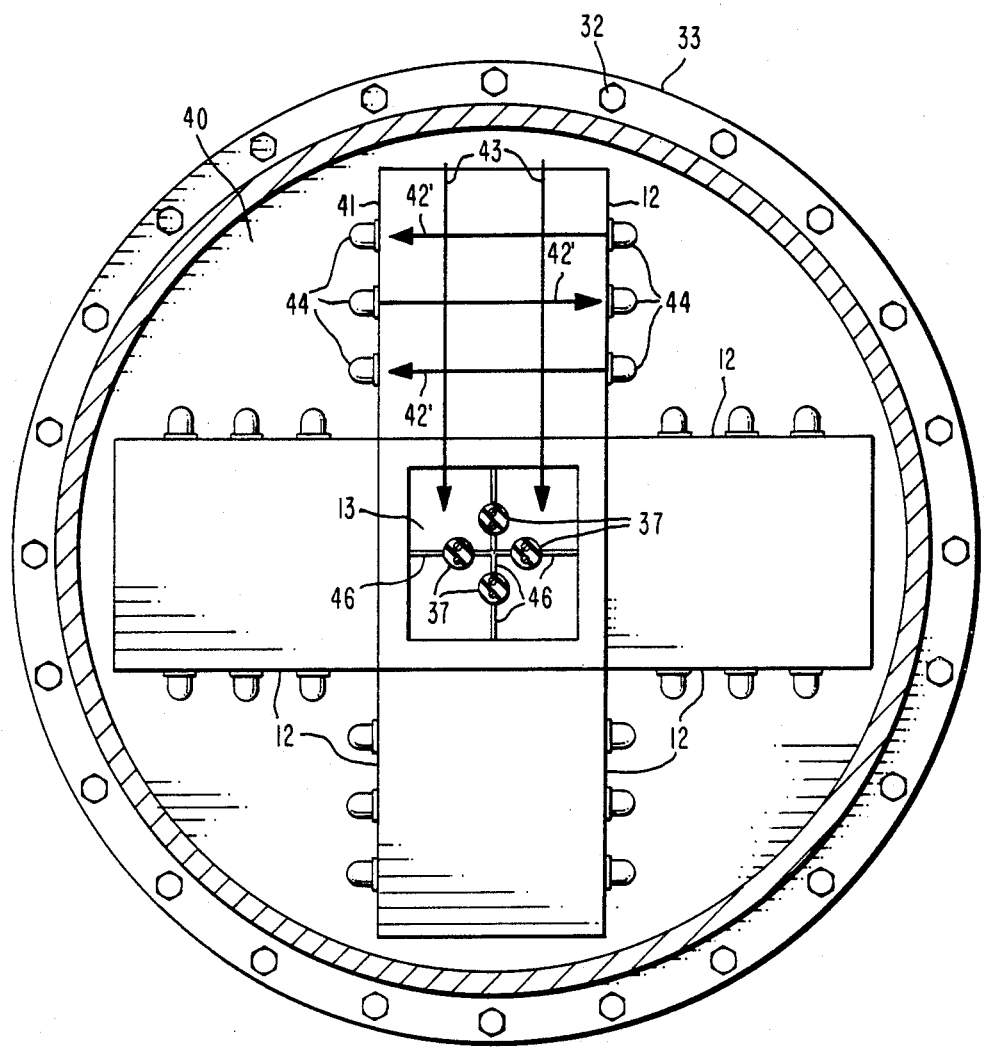
FIG. 4 is a cross-sectional view of FIG. 3 through line IV—IV, showing the four fuel cell stacks, and, in one embodiment of the invention, mounted tubular heating means within the central, enclosed, cooling duct.

FIG. 4 shows a cross section of FIG. 3 through line IV—IV, and provides further details as to the placement and spacing of the heating means. Four fuel cell stacks 12 are shown disposed around central cooling duct 13, completely enclosing the duct and isolating it from the open area 40 between the protective containing vessel 30 and the outside walls 41 of the fuel cell stacks 12.

Oxidant, and fuel, such as hydrogen, flow through the stacks as generally shown by arrows 42 and 42' respectively, in a generally counter flow pattern. Coolant, such as air, is fed into the stacks as generally shown by arrows 43, in a pattern 90° to the fuel and oxidant flow. Pipes 44 allow feed and return of the various gases. The same arrangement is provided on all four of the fuel cell stacks. Heating means 37 are shown in the central cooling duct, spaced from each other and the inside walls of the four fuel cell stacks by any effective heat resistant, insulating tubes, braces or other support means 46. As mentioned previously, these central heaters can be supplemented or replaced by heaters in the open area 40. Heat is radiated to the stack and then conducted through the stack to warm the electrolyte.

Figure 5:
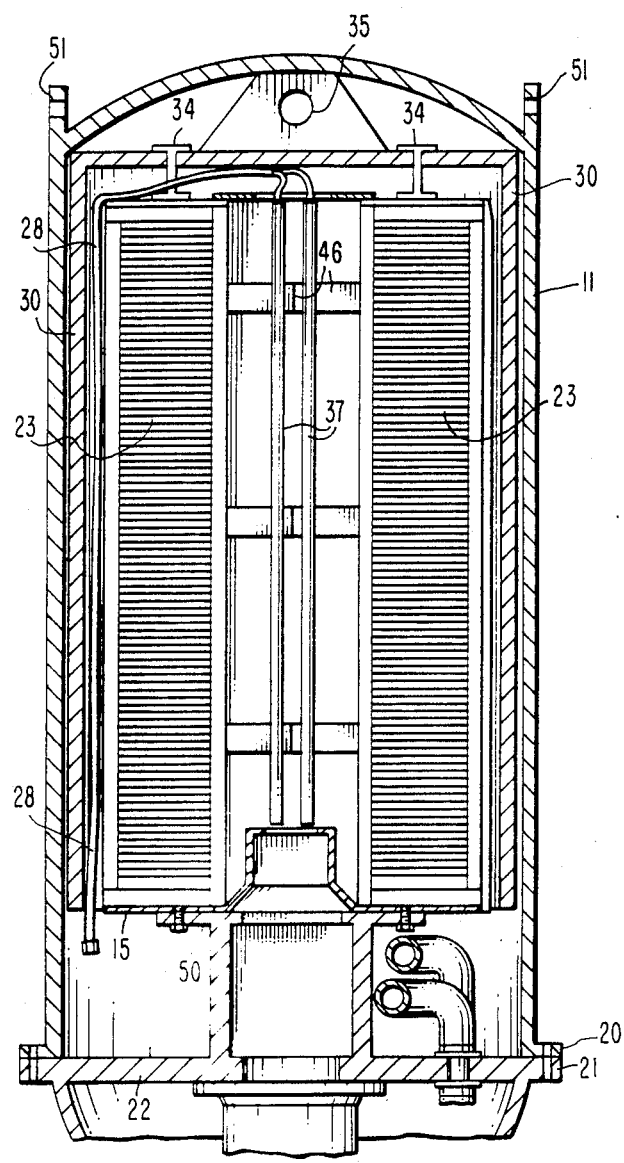
FIG. 5 is a sectional view of a fuel cell stack cartridge supported in its containing vessel, attached to its support structure, and disposed within a heavy, pressure dome, showing the reconnection and heating features.

Referring now to FIG. 5 of the Drawings, the enclosed cartridge of FIG. 3 is shown assembled to its fittings and covered by its protective dome. If the protective containing transport vessel 30 is to remain a permanent part of the module, its bottom, not shown in FIG. 5, can be removed and the transport vessel can be left attached to the fuel cell cartridge 23 by connections 34. The support plate 15 for the cartridge is bolted to the top 50 of the lower pressure vessel bracing plate 22. The pressure dome 11 is lowered onto lower pressure vessel bracing plate 22 and bolted secure through connection holes 21 in flange 20.

Thus, in this embodiment, the pressure dome 11 can be disconnected and lifted slightly from lower pressure vessel bracing plate 22, a power source can be connected to heating wire 28 to start energizing the heating means 37, the pressure dome can be removed by a hoist attached to lifting eyes 51, the bolts attaching the support plate 15 to the top of the bracing plate can be removed, a hoist can be attached to the lifting eye 35 of the transport vessel 30, the entire cartridge and transport vessel can then be removed, a bottom can be bolted onto the transport vessel as shown in FIG. 3, and the whole protected, heated cartridge can then be shipped to another location for remanufacture.

Figure 6:
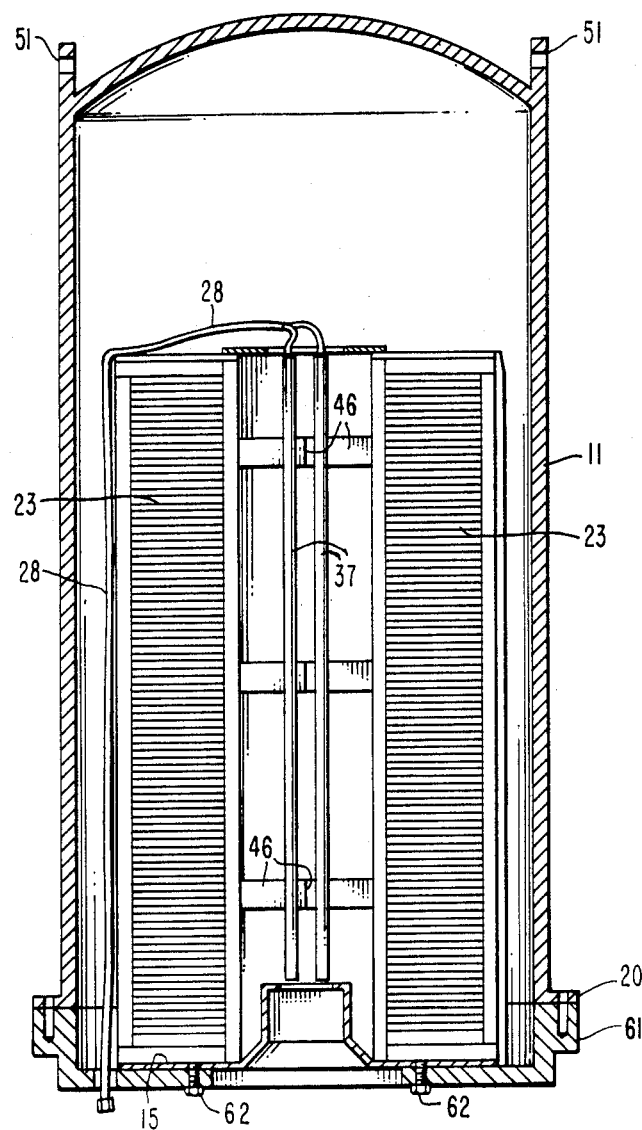
FIG. 6 is a sectional view of a fuel cell stack cartridge, utilizing the pressure dome as a protective containing vessel, showing lift off from its support structure, using lifting fixture connections between the pressure dome flange and a plate in the fuel cell stack cartridge.
Figure 6:
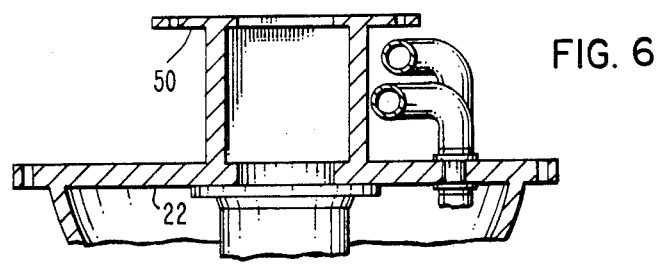

Another embodiment is shown in FIG. 6. There, a separate protective containing transport vessel is not used as a permanent part of the module. In this instance, a lifting fixture 61 would be attached to support plate 15 and the dome 11. In this embodiment, the dome 11 can be disconnected from the lower pressure vessel bracing plate 22, a hoist attached to lifting eyes 51 and the dome lifting slightly, a power source can be connected to heating wire 28 to start energizing the heating means 37, the pressure dome can be lifted more and connections between support plate 15 and the top 50 of the bracing plate would be removed. The lifting fixture would be attached to the dome flange 20 and bolted at 62 to the support plate 15, to securely attach the dome to the bottom of the cartridge. Thus, with the dome acting as protection, the heated cartridge can be transferred to a protected location on the site, to be installed in the transport vessel 30 (not shown, but see FIGS. 3 and 4), for shipment to a plant for remanufacture.

Of course, other protective containing vessels, connection means, cartridge configurations, and the like can be used. Additionally, a protective flow of nitrogen gas can be used, if desired, during transport to provide an inert, low humidity atmosphere. During transport, pressure within the protective vessel would be atmospheric. It is to be understood that the examples provided hereinabove are meant to be illustrative and not limiting, and that other fuel cells containing other types of electrolyte subject to crystallization are considered within the concept disclosed herein.

We claim:
1. A fuel cell cartridge protective system comprising:
 (A) a fuel cell cartridge, not in operation, containing a plurality of fuel cell stacks, each stack containing a plurality of fuel cells containing liquid electrolyte therein which is subject to crystallization;
 (B) a sealed protective containing vessel attached to and enclosing the fuel cell cartridge; and
 (C) electrical heating means attached to a power source, said heating means disposed within the containing vessel and spaced away from the electrolyte containing fuel cell stacks and the containing vessel; said electrical heating means generating an amount of heat effective to provide an electrolyte temperature over the electrolyte crystallization temperature when the fuel cell cartridge is not in operation, and where said heat is radiated to the fuel cell stacks and then conducted through the stacks to warm the electrolyte.

2. The fuel cell cartridge protective system of claim 1, where the fuel cells contain oxidant and fuel passage means, and an electrolyte containing means disposed between an anode and a cathode, where the electrolyte is concentrated phosphoric acid.

3. The fuel cell cartridge protective system of claim 1, wherein the fuel cell stacks are disposed around a central cooling duct, the electrical heating means is disposed within the cooling duct, and the protective vessel has lifting means thereon.

4. The fuel cell cartridge protective system of claim 3, also containing at least one heating means disposed between the fuel cell cartridge and the inner surface of the protective containing vessel.

5. The fuel cell cartridge protective system of claim 1, where the heating means are long tubular resistance heaters.

6. The fuel cell cartridge protective transport system of claim 5, where each heater generates from about 7,000 BTU to about 9,000 BTU of heat per hour, and the electrolyte is from about 95% to about 98% concentrated phosphoric acid.

7. A fuel cell cartridge protective transport system comprising:
 (A) a fuel cell cartridge, not in operation, containing a plurality of fuel cell stacks, each stack containing a plurality of fuel cells containing from about 95% to about 98% concentrated phosphoric acid electrolyte therein which is subject to crystallization, the stacks disposed around a central cooling duct;

(B) electrical heating means disposed within the cooling duct and spaced away from the electrolyte containing fuel cell stacks; and (C) a sealed protective containing vessel attached to and enclosing the fuel cell cartridge and having lifting means thereon; where the electrical heating means is attached to a power source and generates heat, and provides an electrolyte temperature throughout the fuel cell cartridge over the phosphoric acid crystallization temperature of about 38° C., when the fuel cell cartridge is not in operation and is in transport, and where said heat is radiated to the fuel cell stacks and then conducted through the stacks to warm the electrolyte.

8. The fuel cell cartridge protective transport system of claim 7, where the fuel cells contain oxidant and fuel passage means, and an electrolyte containing means disposed between an anode and a cathode, and where the system also contains at least one heating means disposed between the fuel cell cartridge and the inner surface of the protective containing vessel.

9. The fuel cell cartridge protective transport system of claim 7, where the heating means are long tubular resistance heaters, each generating from about 7,000 BTU to about 9,000 BTU of heat per hour.

* * * * *